(12) United States Patent
Kim et al.

(10) Patent No.: US 12,277,057 B2
(45) Date of Patent: *Apr. 15, 2025

(54) BYTE-ADDRESSABLE DEVICE AND COMPUTING SYSTEM INCLUDING SAME

(71) Applicant: XCENA Inc., Seongnam-si (KR)

(72) Inventors: Ju Hyun Kim, Yongin-si (KR); Jin Yeong Kim, Yongin-si (KR); Do Hun Kim, Yongin-si (KR)

(73) Assignee: XCENA Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,008

(22) Filed: Feb. 22, 2024

(65) Prior Publication Data
US 2024/0320149 A1    Sep. 26, 2024

Related U.S. Application Data

(63) Continuation of application No. 18/482,646, filed on Oct. 6, 2023, now Pat. No. 11,940,910.

(30) Foreign Application Priority Data

Mar. 20, 2023    (KR) .................. 10-2023-0035759

(51) Int. Cl.
*G06F 12/06*    (2006.01)
*G06F 12/02*    (2006.01)
(Continued)

(52) U.S. Cl.
CPC ...... *G06F 12/0653* (2013.01); *G06F 12/0292* (2013.01); *G06F 12/0871* (2013.01); *G06F 13/4234* (2013.01); *G06F 2212/7211* (2013.01)

(58) Field of Classification Search
CPC ............ G06F 12/0292; G06F 12/0653; G06F 12/0871; G06F 13/4234; G06F 2212/7211
See application file for complete search history.

(56) References Cited

U.S. PATENT DOCUMENTS 11,048,644 B1    6/2021    Volpe et al.
2017/0206033 A1    7/2017    Ma et al.
(Continued)

FOREIGN PATENT DOCUMENTS

EP    4 123 649 A1    1/2023
KR    10-2012-0082218 A    7/2012
(Continued)

OTHER PUBLICATIONS

Written decision on registration for Korean Application No. 10-2023-0035759 dated Jul. 18, 2023, 6 pages.
(Continued)

*Primary Examiner* — Aracelis Ruiz
(74) *Attorney, Agent, or Firm* — Sughrue Mion, PLLC

(57) ABSTRACT

As one aspect of the present disclosure, a byte-addressable device is disclosed. The device may include: a volatile memory device; and a controller configured to be connected with a host processor, the volatile memory device, and a non-volatile storage device, wherein the controller may be further configured to communicate with the volatile memory device and the non-volatile storage device based on address information included in a request received from the host processor.

18 Claims, 9 Drawing Sheets

(51) Int. Cl.
    *G06F 12/0871*     (2016.01)
    *G06F 13/42*     (2006.01)

(56) References Cited

U.S. PATENT DOCUMENTS

| | | |
|---|---|---|
| 2018/0018171 A1 | 1/2018 | Amidi et al. |
| 2020/0133777 A1* | 4/2020 | Lesartre ............... G06F 3/0688 |
| 2022/0404975 A1 | 12/2022 | Amidi et al. |
| 2023/0071618 A1 | 3/2023 | Shin et al. |
| 2023/0074941 A1 | 3/2023 | Kim et al. |

FOREIGN PATENT DOCUMENTS

| | | |
|---|---|---|
| KR | 10-2017-0026114 A | 3/2017 |
| KR | 10-2017-0087043 A | 7/2017 |
| KR | 10-2018-0012565 A | 2/2018 |
| KR | 10-2018-0044635 A | 5/2018 |
| KR | 10-2446733 B1 | 9/2022 |
| KR | 10-2023-0016110 A | 2/2023 |
| KR | 10-2023-0037240 A | 3/2023 |
| KR | 10-2023-0037296 A | 3/2023 |

OTHER PUBLICATIONS

Request for submission of opinion for Korean Application No. 10-2023-0035759 dated May 17, 2023, 18 pages.

* cited by examiner

BYTE-ADDRESSABLE DEVICE AND COMPUTING SYSTEM INCLUDING SAME

CROSS-REFERENCE TO RELATED APPLICATIONS

This application is a Rule 53(b) Continuation of U.S. application Ser. No. 18/482,646, now U.S. Pat. No. 11,940,910, filed on Oct. 6, 2023, which claims priority under 35 U.S.C § 119 to Korean Patent Application No. 10-2023-0035759, filed on Mar. 20, 2023, in the Korean Intellectual Property Office, the entire contents of which are hereby incorporated by reference.

TECHNICAL FIELD

The present disclosure relates to byte-addressable devices and computing systems including the same.

BACKGROUND

Memories are often connected quickly and directly to CPUs in terms of interfacing with CPUs, and achieve low latency (e.g., tens of ns) and high bandwidths (e.g., tens to hundreds of GB/s) by generally using parallel interfaces (methods of sending data using multiple pin inputs/outputs) such as DDR4, DDR5, or HBM. Examples of memories include DRAM, (NV) DIMM (dual in-line memory module), and the like.

Storage media have evolved in a manner of using high-speed serial interfaces rather than parallel interfaces in terms of cost and scalability, and use storage protocols such as SATA, SAS, and NVMe, or PCIe, an interface commonly used for peripheral expansion. Such interfaces often do not support byte accesses because latencies are very long compared to memories due to the high protocol overhead. Even if it were possible, performance would suffer because the CPU's cache system does not support caching. Because the access time in storage media is so long (e.g., tens of us to tens of ms) in general as to be at a level of allowing the interface overhead (e.g., several us), such interfaces can be used in the storage media. Even if faster memories such as DRAM were used, appropriate performance could not be achieved on the existing serial interfaces.

A DIMM slot for mounting DRAM onto a CPU is a limited resource that uses a lot of pins to be connected to the CPU socket and that can only be mounted within a certain distance from the CPU socket to achieve a high operating frequency. As a result, the maximum amount of memory that can be installed is constrained by a physical space. The number of cores per CPU socket is in a trend of being increased thanks to the improvement in non-memory semiconductor integration, whereas the improvement in the integration for memory semiconductors of producing DRAM is stagnating due to physical limitations. Because of this, the DRAM capacity and bandwidth available per core are rather decreasing. Data is growing exponentially, and big data-based analytics and AI services are emerging as the core of the business, but practically available memory resources are decreasing.

SUMMARY

It is a technical object of the present disclosure to provide a cost-effective high-capacity memory device.

It is another technical object of the present disclosure to provide a new memory tier that fills the performance gap of storage media.

It is yet another technical object of the present disclosure to improve the utilization and availability of existing commercialized storage devices.

It is still another technical object of the present disclosure to provide data movement reduction and computation acceleration functions.

The present disclosure may be implemented in a variety of ways, including devices, systems, methods, or computer programs stored on a readable storage medium.

As one aspect of the present disclosure, a byte-addressable device is disclosed. The device may include: a volatile memory device; and a controller configured to be connected with a host processor, the volatile memory device, and a non-volatile storage device, wherein the controller may be further configured to communicate with the volatile memory device and the non-volatile storage device based on address information included in a request received from the host processor.

In one embodiment, the controller may communicate with the host processor by using a first protocol, communicate with the volatile memory device by using a second protocol, communicate with the non-volatile storage device by using a third protocol. The first protocol and the second protocol may be byte-addressable protocols that allow data to be read and written by assigning addresses in bytes, and the third protocol may be a block-addressable protocol that allows data to be read and written by assigning addresses in blocks.

In one embodiment, the controller may communicate with the host processor over a first interface, communicate with the volatile memory device over a second interface, communicate with the non-volatile storage device over a third interface. The first interface and the third interface may be serial interfaces, and the second interface may be a parallel interface.

In one embodiment, the address information included in the request may include an address in bytes. The controller may: determine whether data corresponding to the address in bytes is stored in the volatile memory device based on a mapping table, and perform at least one of byte addressing to the volatile memory device or block addressing to the non-volatile storage device based on the determination result. The controller may transmit the data corresponding to the address in bytes to the host processor.

In one embodiment, the controller may: in response to determining that the data corresponding to the address in bytes is stored in the volatile memory device, translate the address in bytes into a volatile memory address in bytes by using the mapping table, and perform a data read or write by assigning addresses in bytes to the volatile memory device based on the address in bytes.

In one embodiment, the controller may: in response to determining that the data corresponding to the address in bytes is not stored in the volatile memory device, generate a block address including the address in bytes, and perform a data read or write by assigning addresses in blocks to the non-volatile storage device based on the generated block address.

In one embodiment, the address information included in the request may include an address in bytes. The controller may: in response to determining that the data corresponding to the address in bytes is not stored in the volatile memory device, generate a block address including the address in bytes, secure a space as large as a size of the block address in the volatile memory device, perform a data read in blocks from the non-volatile storage device based on the block address, store data corresponding to the block address in the secured space of the volatile memory device, record the block address and a volatile memory address in which the data corresponding to the block address is stored in the mapping table, translate the address in bytes included in the request into a volatile memory address in bytes by using the mapping table, and perform a data read or data write to the volatile memory device according to the request based on the volatile memory address in bytes.

In one embodiment, before securing the space as large as the size of the block address in the volatile memory device, the controller may: select a victim area in the volatile memory device based on the size of the block address, in response to determining that the victim area of the volatile memory device is in a dirty state, store data of the victim area of the volatile memory device in the non-volatile storage device, and delete an entry associated with the victim area in the mapping table.

In one embodiment, the victim area may be determined to minimize performance degradation and write amplification.

In one embodiment, the controller may: receive a checkpoint request from the host processor, store data of an area, which is in a dirty state, within the volatile memory device in the non-volatile storage device, and release a dirty flag of the area, which is in the dirty state, within the volatile memory device.

In one embodiment, the address information included in the request may include an address in bytes. The controller may include: an address remapper configured to determine whether the data corresponding to the address in bytes is stored in the volatile memory device based on the mapping table, and translate the address in bytes to a volatile memory address in bytes by using the mapping table; and a memory translation controller configured to manage the mapping table that translates reciprocally between byte addressing to the volatile memory device or block addressing to the non-volatile storage device.

In one embodiment, the request may be a write request, and the address remapper may record a dirty flag, which indicates that data has been updated, in meta information corresponding to the address in bytes in response to receiving the write request from the host processor.

In one embodiment, the controller may include: a memory manager configured to secure an empty space in the volatile memory device; and a storage controller configured to drive the non-volatile storage device according to a determination of the memory translation controller, assign addresses in blocks, and perform a data read or write.

In one embodiment, the storage controller may perform a wear leveling algorithm to prevent an uneven wear phenomenon due to biased writes.

In one embodiment, the controller may include: a cache memory configured to store data that has ever been accessed or expected to be accessed; and a memory controller configured to be connected with the volatile memory device and the cache memory.

In one embodiment, the controller may include: a computation accelerator configured to accelerate at least one computation of particular functions of the host processor or particular functions of the controller to minimize data movement between the host processor and the controller.

In one embodiment, the byte-addressable device may include the non-volatile storage device, and the non-volatile storage device may include: a plurality of non-volatile storages; and a switch configured to be connected with the controller and the plurality of non-volatile storages.

According to another aspect of the present disclosure, a computing system is disclosed. The system may include: a host processor; a byte-addressable device; and a non-volatile storage device, and the byte-addressable device may include: a volatile memory device; and a controller configured to be connected with the host processor, the volatile memory device, and the non-volatile storage device, wherein the controller may be further configured to communicate with the volatile memory device and the non-volatile storage device based on address information included in a request received from the host processor.

According to various embodiments of the present disclosure, a large-capacity memory can be configured at the price of a storage medium. As a result, it is expected to be highly useful in applications that deal with large amounts of data, in-memory databases, or the like.

According to various embodiments of the present disclosure, the volatile memory device mounted on the controller is utilized as an intermediate storage in order to assist the performance of the storage medium. In other words, the volatile memory device may function as a kind of cache for the non-volatile storage device.

According to various embodiments of the present disclosure, it can have improved latency performance by caching the volatile memory data as well once again in the cache memory within the controller.

According to various embodiments of the present disclosure, it is possible to provide a high-capacity memory while exhibiting performance between existing memories (50 to 100 ns) and common storage media (10 us).

According to various embodiments of the present disclosure, since the function of providing the byte-addressable memory and the storage device are separated, previously developed and commercialized storage devices can be utilized as they are. Accordingly, since it is possible to implement at a relatively low cost and include functions to protect against failures of the storage device, the availability and service life of the device increases.

The effects of the present disclosure are not limited to those mentioned above, and other effects that have not been mentioned will be clearly understood by those skilled in the art to which the present disclosure pertains (hereinafter referred to as a 'person of ordinary skill') from the description of the claims.

DETAILED DESCRIPTION OF THE PREFERRED EMBODIMENTS

Figure 1:
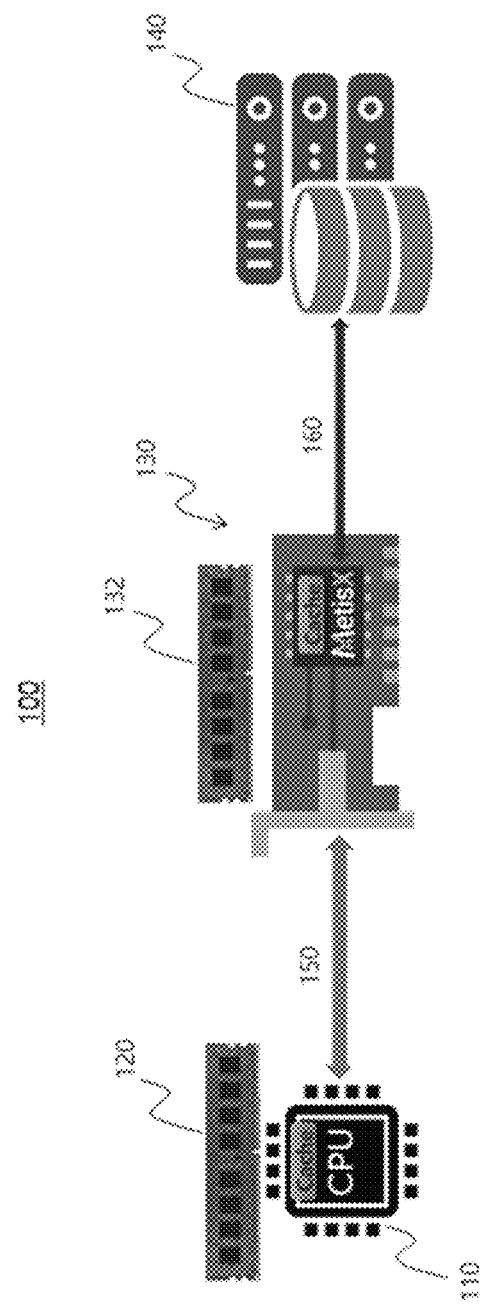
FIG. 1 is an example diagram conceptually illustrating a computing system including a byte-addressable device according to one embodiment of the present disclosure.

Various embodiments set forth herein are illustrated for the purpose of clearly describing the technical ideas of the present disclosure, and are not intended to be limited to particular embodiments. The technical ideas of the present disclosure include various modifications, equivalents, and alternatives of each embodiment set forth herein, and embodiments obtained by selectively combining all or part of each embodiment. In addition, the scope of the technical ideas of the present disclosure is not limited to various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

FIG. 1 is an example diagram conceptually illustrating a computing system 100 including a byte-addressable device according to one embodiment of the present disclosure.

A computing system 100 in accordance with the present disclosure may be a storage server or other kind of server that may be used in a data center. As shown in FIG. 1, the computing system 100 may include a host processor 110 (e.g., x86 CPU, ARM, RISC-V), a byte-addressable device 130, and a non-volatile storage device 140. The host processor 110 may be connected to a host memory 120. The byte-addressable device 130 may include a volatile memory device 132.

The computing system 100 in accordance with the present disclosure may have a scalable device structure that can use the volatile memory device 132 of the byte-addressable device 130 as an intermediate storage medium and the non-volatile storage device 140 as a final storage medium. The host processor 110 may recognize the total capacity of the non-volatile storage device 140 connected to the byte-addressable device 130. With this configuration, a byte-addressable memory of large capacity can be implemented at a relatively low cost and at the same time, non-volatile characteristics can be utilized in the computing system 100 in accordance with the present disclosure.

The host processor 110 may communicate with the byte-addressable device 130 by using a first interface 150. The first interface 150 may be a serial interface, and may be, for example, an interface using a compute express link (CXL) protocol. The byte-addressable device 130 may communicate with the non-volatile storage device 140 by using a second interface 160. The second interface 160 may be a serial interface.

In the computing system 100 in accordance with the present disclosure, the first interface 150 may be a byte-addressable protocol (or byte addressing protocol), and the second interface 160 may be a block-addressable protocol (or block addressing protocol). The host processor 110 may assign addresses in bytes and read and write data to the byte-addressable device 130. The byte-addressable device 130 may assign addresses in blocks and read and write data to the non-volatile storage device 140. The byte-addressable device 130 may retrieve data in blocks from the non-volatile storage device 140 based on the byte addresses and store the data in the volatile memory device 132 of the byte-addressable device 130. The byte-addressable device 130 may access data corresponding to the address requested by the host processor 110 out of data stored in the volatile memory device 132.

According to one embodiment, the byte-addressable device 130 may internally have a cache for data stored in the volatile memory device 132 to improve performance. In this case, by caching the data of the volatile memory device 132 as well once again in the cache memory within the byte-addressable device 130 while utilizing the volatile memory device 132 provided in the byte-addressable device 130 as an intermediate storage to assist the performance of the non-volatile storage device 140, it can have low-latency performance at the level of 100 ns at cache hit, 200 ns at cache miss, and 10 us in case of needing to retrieve from the non-volatile storage device 140.

The byte-addressable device 130 may have a PCIe root complex port for storage interface expansion. In addition, by having a plurality of PCIe switches or host bus adapters, the byte-addressable device 130 may connect a plurality of non-volatile storages or a plurality of non-volatile storage devices 140 and expand capacity and improve performance. In general, the non-volatile storage device 140 may have lower durability and reliability compared to the volatile memory device 132. In view of this, the configuration in accordance with the present disclosure is advantageous in terms of maintenance efficiency in that even if a problem occurs in the non-volatile storage device 140, it can be dealt with by a simple replacement with a new device.

FIG. 1 illustrates that the non-volatile storage device 140 is configured separately from the byte-addressable device 130 for the convenience of description. However, the present disclosure is not limited thereto. For example, in the present disclosure, the non-volatile storage device 140 may be configured to be integrated with the byte-addressable device 130.

Figure 2:
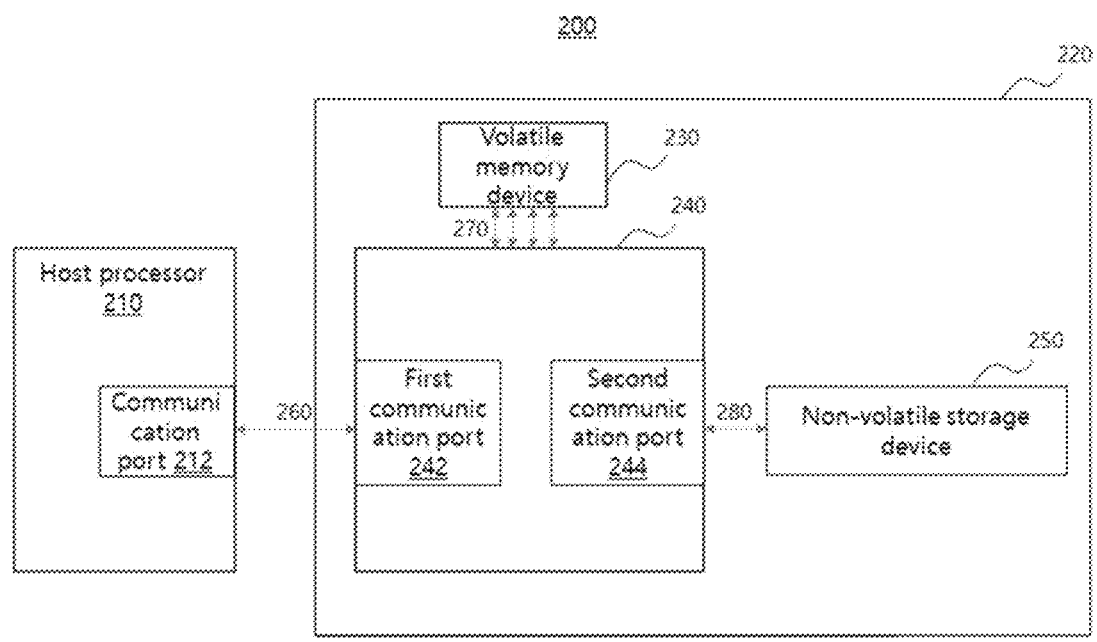
FIG. 2 is a block diagram of a computing system including a byte-addressable device in accordance with one embodiment of the present disclosure.
Figure 3:
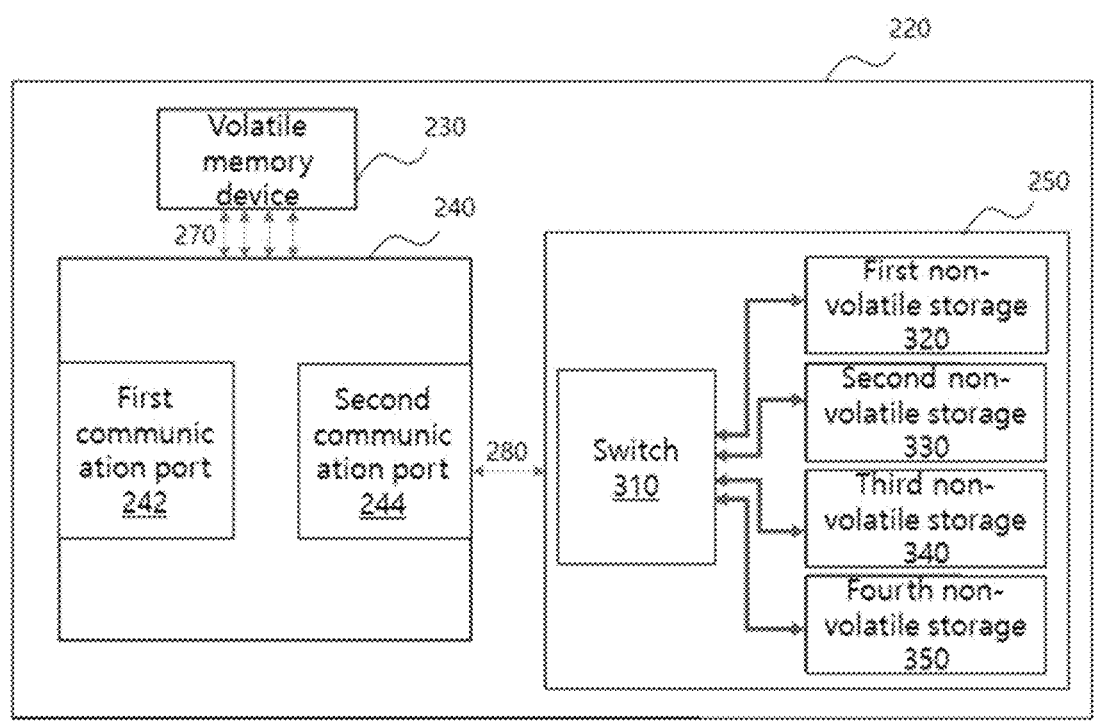
FIG. 3 is a block diagram of a byte-addressable device in accordance with one embodiment of the present disclosure.

FIG. 2 is a block diagram of a computing system 200 including a byte-addressable device 220 in accordance with one embodiment of the present disclosure, and FIG. 3 is a block diagram of a byte-addressable device 220 in accordance with one embodiment of the present disclosure.

As shown in FIG. 2, the computing system 200 includes a host processor 210 and a byte-addressable device 220. The host processor 210 may include a communication port 212. The byte-addressable device 220 may include a volatile memory device 230, a controller 240, and a non-volatile storage device 250. FIG. 2 illustrates that the non-volatile storage device 250 is included in the byte-addressable device 220 for the convenience of description, but the present disclosure is not limited thereto and the non-volatile storage device 250 may be configured separately from the byte-addressable device 220.

The host processor 210 may refer to a set of one or more processors. The host processor 210 may control at least one component of a device or terminal (e.g., the byte-addressable device 220) connected to the host processor 210 by driving software (e.g., commands, programs, etc.). In addition, the host processor 210 may perform operations such as various computations, processing, data generation or processing. In addition, the host processor 210 may load data or the like from various memory devices or storage devices, or store data or the like in the memory devices or storage devices.

The controller 240 may have one or more volatile memory channels, and may communicate with individual components or the volatile memory device 230 via these volatile memory channels. The volatile memory device 230 may be, for example, a DIMM-type DRAM. The controller 240 may include a first communication port 242 and a second communication port 244. For example, the first communication port 242 may be a CXL end point, and the second communication port 244 may be a PCIe root complex port.

The controller 240 may communicate with the host processor 210 over a first interface 260 via the first communication port 242 and the communication port 212. Further, the controller 240 may communicate with the volatile memory device 230 over a second interface 270. In addition, the controller 240 may communicate with the non-volatile storage device 250 over a third interface 280 via the second communication port 244. Here, the first interface 260 and the third interface 280 may be serial interfaces, and the second interface 270 may be a parallel interface.

The controller 240 may communicate with the host processor 210 in a first protocol. Further, the controller 240 may communicate with the volatile memory device 230 in a second protocol. Moreover, the controller 240 may communicate with the non-volatile storage device 250 in a third protocol. Here, the first protocol and the second protocol may be byte-addressable protocols that allow data to be read and written by assigning addresses in bytes, and the third protocol may be a block-addressable protocol that allows data to be read and written by assigning addresses in blocks.

The non-volatile storage device 250 may include one or more non-volatile storages. According to one embodiment, as many non-volatile storages as the interfaces allow may be directly connected to the second communication port 244.

The controller 240 in accordance with the present disclosure may receive a request or command including an address in bytes from the host processor 210. The request may be a request for data reads or writes, and may be transferred via the communication port 212 and the first communication port 242. The controller 240 may determine whether data corresponding to the address in bytes is stored in the volatile memory device 230 based on a mapping table. The controller 240 may perform at least one of byte addressing to the volatile memory device 230 or block addressing to the non-volatile storage device 250 based on the determination result. In addition, the controller 240 may transmit the data corresponding to the address in bytes to the host processor 210 or allow an access by the host processor 210.

In response to determining that the data corresponding to the address in bytes is stored in the volatile memory device 230, the controller 240 in accordance with the present disclosure may translate the address in bytes into a volatile memory address in bytes by using a mapping table. The controller 240 may perform a data read or write by assigning an address in bytes to the volatile memory device 230 based on the address in bytes, or may cause the host processor 210 to perform a data read or write.

In response to determining that the data corresponding to the address in bytes is not stored in the volatile memory device 230, the controller 240 in accordance with the present disclosure may generate a block address including the address in bytes. The controller 240 may perform a data read or write by assigning an address in blocks to the non-volatile storage device 250 based on the generated block address, or may cause the host processor 210 to perform a data read or write.

Referring to FIG. 3, the non-volatile storage device 250 may further include a switch 310. The switch 310 may be a PCIe switch, a host bus adapter, or other component capable of connecting the non-volatile storage device 250 via the second communication port 244. The non-volatile storage device 250 may include a plurality of non-volatile storages 320 to 350. The byte-addressable device 220 may connect a relatively larger number of non-volatile storages to the controller 240 via the switch 310. Here, the plurality of non-volatile storages 320 to 350 may include a hard disk drive (HDD), a solid-state drive (SSD), and the like.

In the byte-addressable device 220 in accordance with the present disclosure, the PCIe switch, the host bus adapter, and the plurality of non-volatile storages 320 to 350 may be mounted at a farther location from the controller 240 than the volatile memory device 230. With this configuration, if the computing system 200 or the byte-addressable device 220 is configured as a single chassis, the PCIe switch, the host bus adapter, and the plurality of non-volatile storages 320 to 350 may be mounted in the spare space of the chassis.

As a comparative example, instead of configuring the controller 240 in accordance with the present disclosure, a configuration that supports a communication interface with the host processor 210 in the non-volatile storage device or non-volatile storages may be assumed. In this comparative example, the non-volatile storage device or the non-volatile storages must individually have a complex communication interface, a volatile memory of sufficient capacity, and a cache memory for improving performance. Because of these drawbacks, the cost of producing the non-volatile storage device or the non-volatile storages is inevitably higher in the comparative example than in the present disclosure. In addition, since non-volatile storage devices or non-volatile storages are less durable and reliable than volatile memory devices due to the nature of storage media, non-volatile storage devices or non-volatile storages should be used with the possibility of failure in mind. According to the present disclosure, it is possible to obtain an advantage that when a failure occurs in the non-volatile storage device or the non-volatile storage, it can be replaced more efficiently than in the comparative example, and the replacement cost is low as well.

Figure 4:
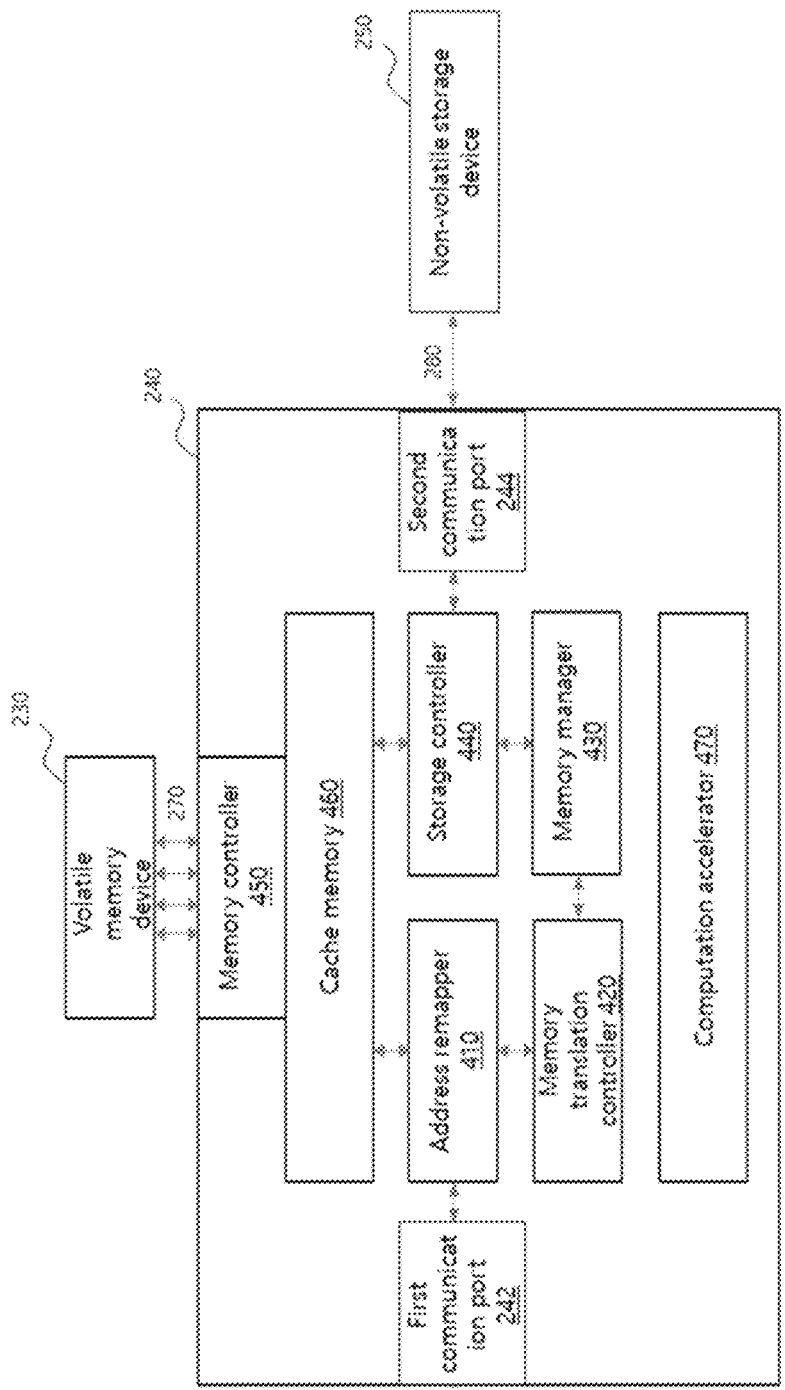
FIG. 4 is a block diagram of a controller in accordance with one embodiment of the present disclosure.

FIG. 4 is a block diagram of a controller 240 in accordance with one embodiment of the present disclosure.

As shown in FIG. 4, the controller 240 may include an address remapper 410 and a memory translation controller 420. The controller 240 may receive a read or write request including address information in bytes from the host processor 210 via the first communication port 242. The address remapper 410 may determine whether the data to which the address in bytes included in the request corresponds is stored in the volatile memory device 230 based on the mapping table. If it is determined that the data is stored in the volatile memory device 230, the address remapper 410 may translate the address in bytes into a physical address of the volatile memory device 230 (or volatile memory address). The address remapper 410 transfers the translated address to the host processor 210 and allows the host processor 210 to access the data in the volatile memory device 230. If it is determined that the data is not stored in the volatile memory device 230, the address remapper 410 sends the address information in bytes received from the host processor 210 to the memory translation controller 420.

The address remapper 410 may receive a write request including an address in bytes from the host processor 210. In response to receiving the write request, the address remapper 410 may record a dirty flag, which indicates that the data has been updated, in the meta information associated with the volatile memory address in bytes corresponding to the address in bytes.

The memory translation controller 420 may create or manage the mapping table the address remapper 410 utilizes. In the mapping table, byte addressing to the volatile memory device 230 and block addressing to the non-volatile storage device 250 correspond to each other. The mapping table may be stored in one area of the volatile memory device 230. The memory translation controller 420 may determine and execute memory translation operations between the volatile memory device 230 and the non-volatile storage device 250. The memory translation controller 420 may update the mapping table according to these memory translation operations. The updated mapping table may be used by the address remapper 410.

The memory translation controller 420 may determine whether to retrieve or copy predetermined data stored in the non-volatile storage device 250 to the volatile memory device 230. According to one embodiment, the memory translation controller 420 may determine to retrieve data expected to be called by the host processor 210, out of data stored in the non-volatile storage device 250, to the volatile memory device 230. For example, the data expected to be called may be associated with a working set whose frequency of use is higher than a threshold. The memory translation controller 420 may read data from the non-volatile storage device 250 and store it in the volatile memory device 230. In this case, the memory translation controller 420 may associate the block address of the non-volatile storage device 250 where the data was located with the byte address of the volatile memory device 230 where the data is to be stored and store them in the mapping table.

The memory translation controller 420 may determine whether to send or copy predetermined data stored in the volatile memory device 230 to the non-volatile storage device 250. According to one embodiment, the memory translation controller 420 may determine to send data, which is not expected to be called by the host processor 210, out of data stored in the volatile memory device 230 to the non-volatile storage device 250. For example, the data that is not expected to be called may be associated with a data set whose frequency of use is lower than a threshold. The memory translation controller 420 may delete the data, which has been sent to the non-volatile storage device 250, from the volatile memory device 230. In this case, the memory translation controller 420 may delete the block address of the non-volatile storage device 250 and the byte address of the volatile memory device 230 that were associated with each other and stored in the mapping table.

The controller 240 in accordance with the present disclosure may further include a memory manager 430 and a storage controller 440. The memory manager 430 may allocate the volatile memory required for a memory translation operation. The memory manager 430 may secure an empty space in the volatile memory device 230. According to one embodiment, in response to the memory translation controller 420 determining to retrieve the predetermined data stored in the non-volatile storage device 250 to the volatile memory device 230, the memory manager 430 may allocate an empty space as large as the block size in the volatile memory device 230.

The storage controller 440 may drive the non-volatile storage device 250 according to the determination of the memory translation controller 420 and perform a data read or write by assigning addresses in blocks. According to one embodiment, in response to the memory translation controller 420 determining to retrieve the predetermined data stored in the non-volatile storage device 250 to the volatile memory device 230 and that the memory manager 430 has allocated an empty space as large as the block size in the volatile memory device 230, the storage controller 440 may drive the non-volatile storage device 250 and read block data from the non-volatile storage device 250.

The storage controller 440 in accordance with the present disclosure may perform a wear leveling algorithm to prevent uneven wear phenomena due to biased writes.

The controller 240 in accordance with the present disclosure may further include a cache memory 460 and a memory controller 450. The cache memory 460 may store data that has ever been accessed or is expected to be accessed. Accesses to the cache memory 460 may have a relatively low latency compared to accesses to the volatile memory device 230. For example, accesses to the volatile memory device 230 have a latency of 50 to 100 ns, and accesses to the cache memory 460 have a latency of 1 to 10 ns. According to one embodiment, the cache memory 460 may be implemented with SRAM. The controller 240 may achieve performance improvements, in particular, improvements in read and write speeds by further including the cache memory 460. The memory controller 450 may be connected to the volatile memory device 230 and the cache memory 460.

The controller 240 in accordance with the present disclosure may further include a computation accelerator 470. The computation accelerator 470 can minimize data movement between the host processor 210 and the controller 240 by performing computational functions based on a large-capacity memory. With these features, the overall performance of the computing system 200 can be improved. The computation accelerator 470 may be configured to accelerate at least one computation of particular functions of the host processor 210 or particular functions of the controller 240. For example, the computation accelerator 470 may accelerate a data-based computation function of the host processor 210 or a raid recovery function of the controller 240.

The address remapper 410, the memory translation controller 420, the memory manager 430, the storage controller 440, the memory controller 450, and the computation accelerator 470 shown in FIG. 4 may each be implemented as a hardware device or software code. According to one embodiment, the address remapper 310 may be implemented as a hardware device, and the other components may be implemented as software code. According to another embodiment, the address remapper 410 and the memory translation controller 420 may be implemented as hardware devices, and the other components may be implemented as software code. In addition, FIG. 4 shows the components of the controller by way of example, and the present disclosure is not limited thereto. For example, it may be implemented such that some of the components shown in FIG. 4 may be omitted or functions of particular components may be included in other components.

Figure 5:
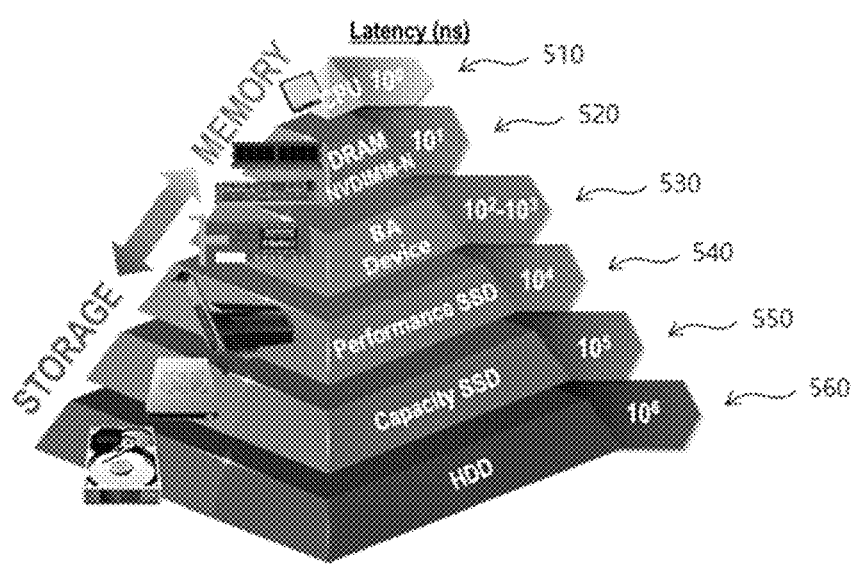
FIG. 5 is a diagram for describing the performance of a byte-addressable device in accordance with one embodiment of the present disclosure.

FIG. 5 is a diagram for describing the performance of a byte-addressable device 530 in accordance with one embodiment of the present disclosure.

Devices used for the purpose of storing data in a computer structure may be largely divided into memory devices and storage devices. A representative example of a memory device is DRAM, which is characterized by being closely connected to the host processor 210 and capable of reading and writing by assigning addresses in bytes (byte-addressable). Storage devices may include conventional hard disk drives (HDDs) based on rotatable disks and solid-state drives (SSDs) based on flash memory. For example, volatile memory device 230 in accordance with the present disclosure may correspond to a memory device, and the non-volatile storages 320 to 350 or the non-volatile storage device 250 including the same in accordance with the present disclosure may correspond to the storage device.

The memory device may have, for example, a size on the order of tens to hundreds of GB and a latency on the order of 50 to 100 ns. It is difficult for memory devices to be configured in a large capacity because they are more expensive and have a lower degree of integration per unit area than storage devices. In addition, since DRAM is volatile, it cannot be used for applications requiring permanent storage.

The storage device may have, for example, a size on the order of several tens of TB and a latency on the order of 10 to 100 us. The storage device can integrate a large capacity in a small space at a low cost. The storage device has a restriction that it cannot directly use addresses in bytes, and must read and write at once in block sizes of 512 Bytes, 4 KB, or more. In addition, since the storage device is mainly managed via the file system of the operating system (OS), there is inconvenience of having to use a special application programming interface (API) in order to use the storage device. Accordingly, the performance is lower than that of a device that can read and write by assigning addresses in bytes, such as the memory device.

Considering the advantages and disadvantages of the memory device and the storage device described above, layers were configured according to the performance, price, and characteristics of the devices except for the byte-addressable device 530 of FIG. 5, for example, a CPU cache memory 510, a DRAM 520, a performance SSD 540, a capacity SSD 550, and an HDD 560, and data was arranged and used as needed in many existing computing systems.

The byte-addressable device 530 in accordance with the present disclosure is a device in which an address space as large as the storage size can be freely accessed in bytes from the host processor 210. The byte-addressable device 530 retrieves data stored in blocks in the non-volatile storage device 250 to the volatile memory device 230 as needed and supports accesses in bytes. With this configuration, the byte-addressable device 530 can realize a byte-addressable memory of large capacity at a relatively low cost, and can also utilize non-volatile characteristics.

The byte-addressable device 530 in accordance with the present disclosure provides a new memory tier that fills the performance gap of the existing performance SSD 540, capacity SSD 550, and HDD 560. The reason the existing performance SSD 540, capacity SSD 550, and HDD 560 could not be used as a byte-addressable memory was because the operating speed was significantly slower than that of the DRAM 520 and there was no interface that could utilize the cache system of the host processor 210. In the present disclosure, the volatile memory device 230 mounted on the controller 240 may be utilized as an intermediate storage (i.e., the volatile memory device 230 functions as a kind of cache for the non-volatile storage device 250) in order to assist the performance of the non-volatile storage device 250, and it can have low latency performance at a level of hundreds of ns. In the case where the working set of an application program is smaller than the size of the volatile memory device 230 connected to the controller 240 or workloads have high locality, such as accessing in a sequential pattern, performance comparable to that of the host memory can be obtained. In addition, if the CXL interface is used between the host processor 210 and the byte-addressable device 530, data can be loaded into the host CPU cache, and overall performance can be further improved. Through this, it is possible to provide a high-capacity memory while exhibiting performance between the existing host memory (50 to 100 ns) and common storage media (at a level of 10 us).

Figure 6:
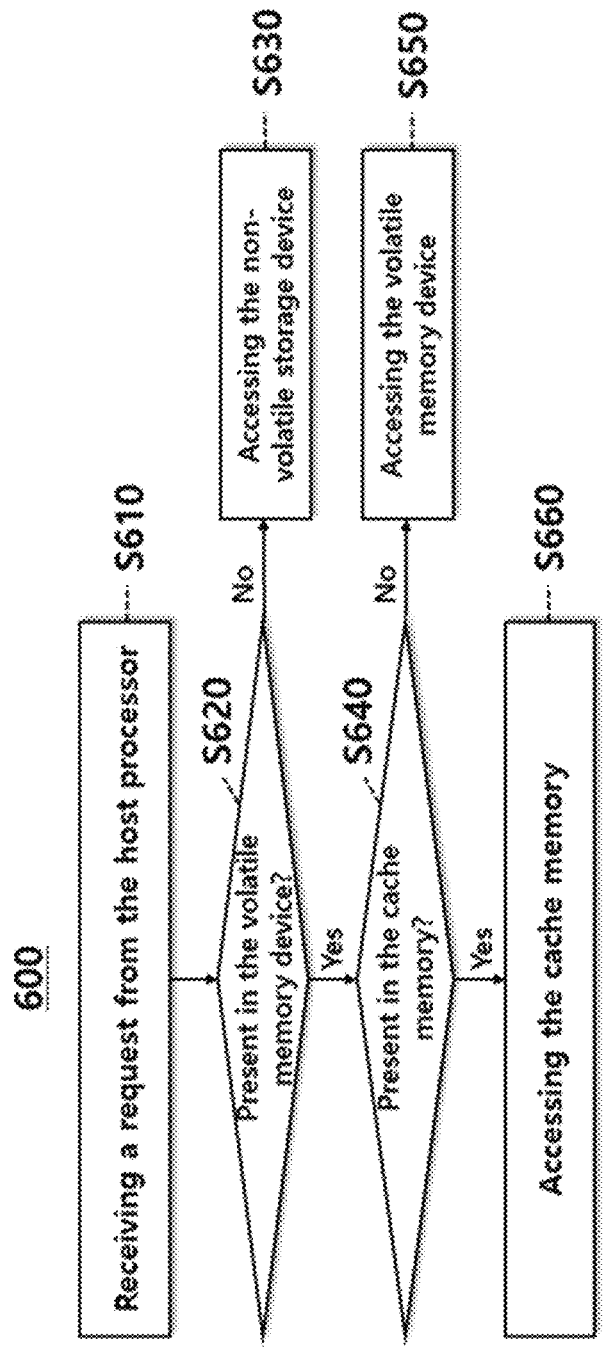
FIG. 6 is a flowchart regarding an operation of determining a priority in which a byte-addressable device accesses a memory or storage device in order to process a request of a host processor, according to one embodiment of the present disclosure.

FIG. 6 is a flowchart 600 regarding an operation of determining a priority in which a byte-addressable device 220 accesses a memory device or a storage device in order to process a request of a host processor 210, according to one embodiment of the present disclosure.

The byte-addressable device 220 may receive a request from the host processor 210 (S610). The request from the host processor 210 may be a data read or write request. According to one embodiment, the host processor 210 may check whether corresponding data is present in the cache memory of the host processor 210 (e.g., the cache memory shown within the host processor 110 of FIG. 1) before sending a data read or write request to the byte-addressable device 220. In response to determining that the corresponding data is not present in the cache memory of the host processor 210 as a result of checking, the host processor 210 may determine to send the request to the byte-addressable device 220. The request received by the byte-addressable device 220 may include an address in bytes.

Next, the byte-addressable device 220 may determine whether data corresponding to the address in bytes is present in the volatile memory device 230 (S620). In response to determining in the determination step S620 that it is not present in the volatile memory device 230, the byte-addressable device 220 may access the non-volatile storage device 250 (S630).

In response to determining in the determination step S620 that it is present in the volatile memory device 230, the byte-addressable device 220 may determine whether the data corresponding to the address in bytes is present in the cache memory 460 (S640). In response to determining in the determination step S640 that it is not present in the cache memory 460, the byte-addressable device 220 may access the volatile memory device 230 (S650). The byte-addressable device 220 may transmit the data corresponding to the address in bytes from the volatile memory device 230 to the host processor 210, or process to allow the host processor 210 to access the corresponding data in the volatile memory device 230. According to one embodiment, the byte-addressable device 220 may store the data corresponding to the address in bytes stored in the volatile memory device 230 in the cache memory 460. As a result, if there is a request for access to the same data from the host processor 210 later, a cache hit can occur, and the processing speed can thus be improved.

In response to determining in the determination step S640 that it is present in the cache memory 460, the byte-addressable device 220 may transmit the data corresponding to the address in bytes from the cache memory 460 to the host processor 210 (S660).

Figure 7:
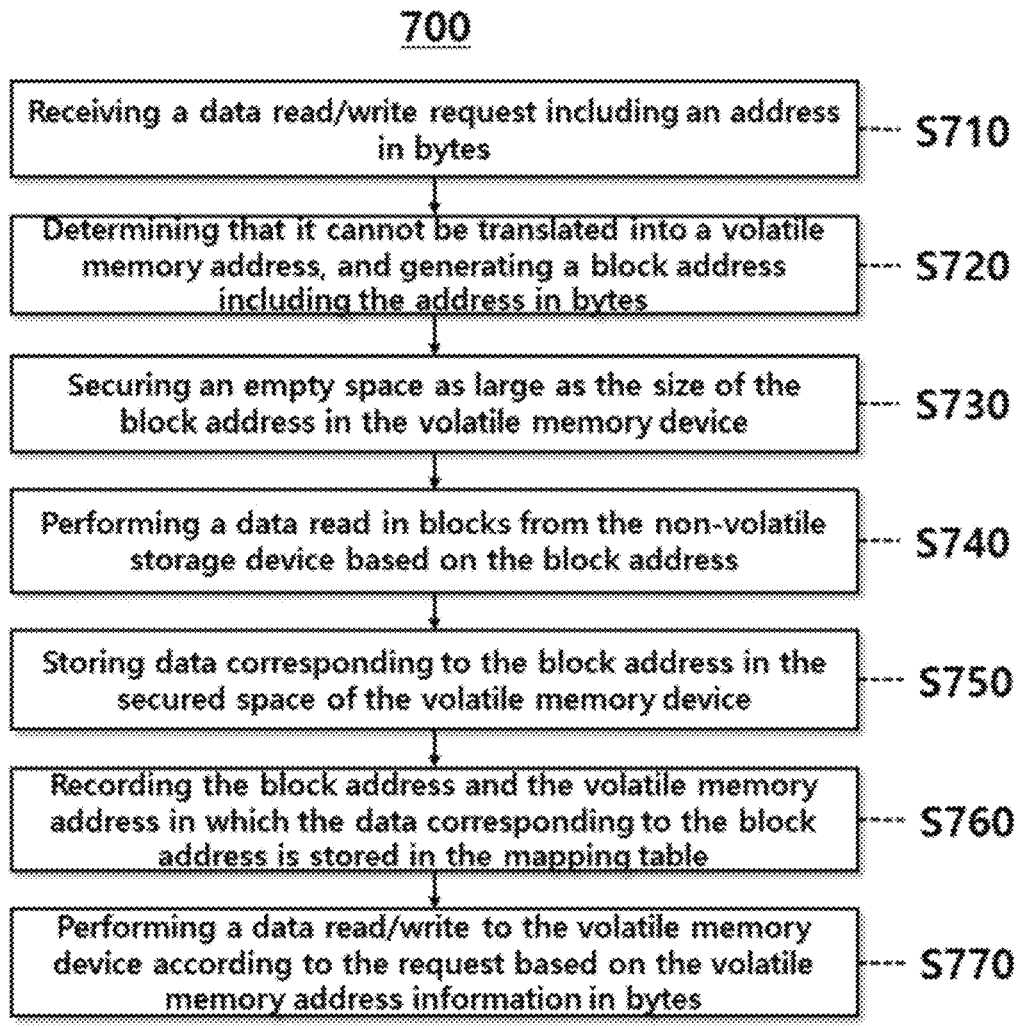
FIG. 7 is a flowchart regarding an operation in which a controller processes a read or write request of a host processor according to one embodiment of the present disclosure.

FIG. 7 is a flowchart 700 regarding an operation in which a controller 240 processes a read or write request of a host processor 210 according to one embodiment of the present disclosure. According to one embodiment, the flow chart 700 shown in FIG. 7 may be a process of processing a corresponding request in a state in which the data requested from the host processor 210 is not recorded in the volatile memory device 230 (i.e., a state in which the data is present in the non-volatile storage device 250 only).

The controller 240 may receive a data read or write request including an address in bytes from the host processor 210 (S710). For example, the controller 240 may receive the corresponding request by communicating with the host processor 210 via the first communication port 242.

Next, the controller 240 may determine that it cannot be translated into a volatile memory address, and generate a block address including the address in bytes (S720). For example, the address remapper 410 of the controller 240 may determine whether to remap based on the mapping table. The address remapper 410 may determine whether the data to which the address in bytes included in the request corresponds is stored in the volatile memory device 230 by using the mapping table. Since the address in bytes included in the request is not mapped in the mapping table, the address remapper 410 may determine that remapping is not possible and transfer the address in bytes included in the request to the memory translation controller 420. The memory translation controller 420 may generate a block address including the requested address.

Next, the controller 240 may secure an empty space as large as the size of the block address in the volatile memory device 230 (S730). For example, the memory manager 430 secures an empty space as large as the size of the block address in the volatile memory device 230. In response to the space being secured, the memory manager 430 transmits a request to the storage controller 440.

Next, the controller 240 may perform a data read in blocks from the non-volatile storage device 250 based on the block address (S740). For example, the storage controller 440 requests the non-volatile storage device 250 to transmit block data in response to being requested by the memory manager 430. The storage controller 440 may transfer the corresponding request to the non-volatile storage device 250 via the second communication port 244.

Next, the controller 240 may store data corresponding to the block address in the secured space of the volatile memory device 230 (S750). For example, the storage controller 440 may retrieve the data corresponding to the block address from the non-volatile storage device 250 via the second communication port 244. The storage controller 440 may cause the memory controller 450 to store the block data retrieved from the non-volatile storage device 250 in the secured space of the volatile memory device 230. Once the storage of the block data is completed, the storage controller 440 may notify the memory translation controller 420 of the completion of the processing.

Next, the controller 240 may record the block address and the volatile memory address in which the data corresponding to the block address is stored in the mapping table (S760). For example, the memory translation controller 420 may map the block address and the address of the volatile memory device 230 in which the data corresponding to the block address is stored, and record them in the mapping table. When the recording of the mapping table is completed, the memory translation controller 420 may allow the address remapper 410 to resume the processing of the request.

Next, the controller 240 may perform a data read or write to the volatile memory device 230 according to the request based on the volatile memory address information in bytes (S770). For example, the address remapper 410 may determine whether to remap again based on the updated mapping table. The address remapper 410 may determine whether the data to which the address in bytes included in the request corresponds is stored in the volatile memory device 230 by using the updated mapping table. Since the address in bytes included in the request is mapped in the mapping table, the address remapper 410 may determine that remapping is possible. The address remapper 410 may translate the address in bytes included in the request into a physical address of the volatile memory device 230 and transfer it to the volatile memory device 230 by way of the memory controller 450. The address remapper 410 may access the volatile memory device 230 and perform a data read or write. If the address recorded in the mapping table is present in the cache memory 460, the address remapper 410 may access the cache memory 460 and read or write the data.

If the data requested by the host processor 210 is recorded in the volatile memory device 230, the controller 240 may perform steps S710 and S770 of the flowchart 700 shown in FIG. 7. For example, the controller 240 may communicate with the host processor 210 via the first communication port 242 and receive a data read or write request including addresses in bytes. Next, the address remapper 410 of the controller 240 may determine that remapping is possible based on the mapping table. The address remapper 410 may translate the address in bytes included in the request into a physical address of the volatile memory device 230 and transfer it to the volatile memory device 230 by way of the memory controller 450. The address remapper 410 may access the volatile memory device 230 and read or write the data to the volatile memory device 230.

If the request received from the host processor 210 is a write request, the controller 240 may mark a separate meta information structure as dirty. For example, the address remapper 410 may record a dirty flag, which indicates that the data has been updated, in the meta information corresponding to the address in bytes included in the write request.

Figure 8:
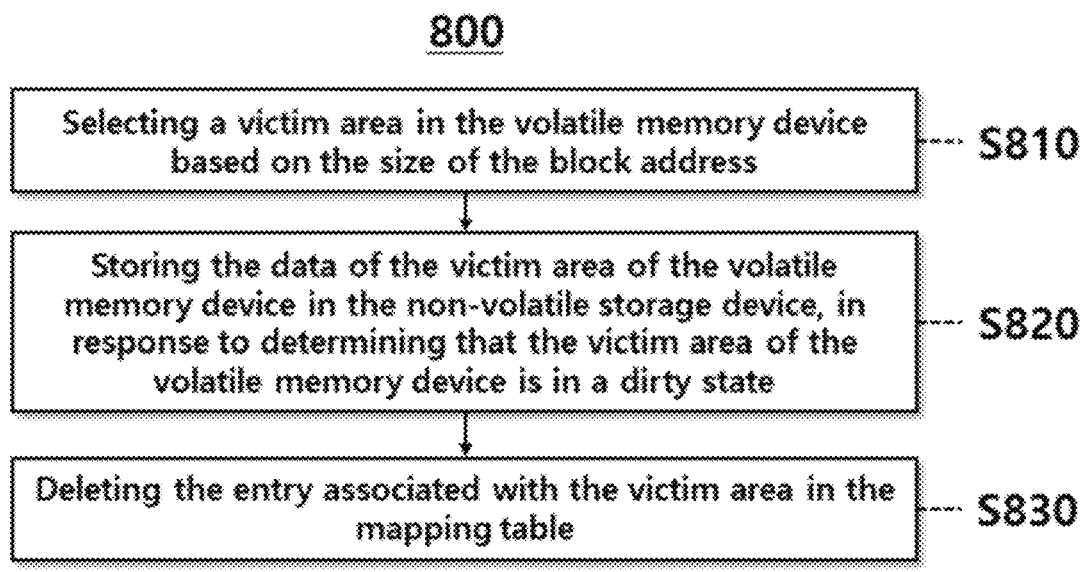
FIG. 8 is a flowchart regarding an operation in which a controller secures a spare space in a volatile memory device according to one embodiment of the present disclosure.

FIG. 8 is a flowchart 800 regarding an operation in which a controller 240 secures a spare space in a volatile memory device according to one embodiment of the present disclosure.

The controller 240 may select a victim area in the volatile memory device 230 based on the size of the block address (S810). According to one embodiment, in order to process a new request in the memory translation controller 420, an empty space as large as the block size must be secured in the volatile memory device 230. Accordingly, it is necessary to delete the block data that was being used previously in the volatile memory device 230 and update it with new data. To this end, the controller 240 in accordance with the present disclosure may select an optimal victim area in the volatile memory device 230. As one example, the memory translation controller 420 may determine a victim area to minimize performance degradation and write amplification by using a predetermined algorithm.

Next, in response to determining that the victim area of the volatile memory device 230 is in a dirty state, the controller 240 may store the data of the victim area of the volatile memory device 230 in the non-volatile storage device 250 (S820). For example, if it is determined that the selected victim area is in the dirty state, the memory translation controller 420 stores the data of the victim area of the volatile memory device 230 in the non-volatile storage device 250 via the storage controller 440 and the memory controller 450. When the storage of the data of the victim area in the non-volatile storage device 250 has been completed, the memory controller 450 deletes the data of the victim area from the volatile memory device 230. With this feature, the performance of the computing systems 100 and 200 can be improved while maintaining consistency of data.

Next, the controller 240 may delete the entry associated with the victim area in the mapping table (S830). When the return of the victim area is completed, the memory translation controller 420 deletes the entry associated with the victim area in the mapping table. As a result, remapping for the victim area will not work.

Figure 9:
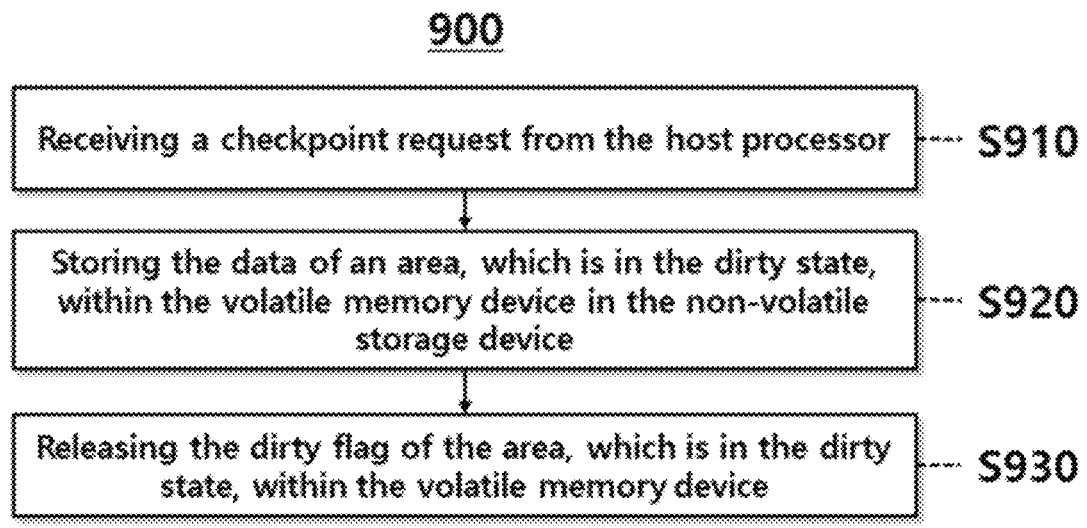
FIG. 9 is a flowchart regarding an operation in which a controller processes a checkpoint request from a host processor according to one embodiment of the present disclosure.

FIG. 9 is a flowchart 900 regarding an operation in which a controller 240 processes a checkpoint request from a host processor 210 according to one embodiment of the present disclosure.

The controller 240 may receive a checkpoint request from the host processor 210 (S910). For example, the controller 240 may receive a checkpoint request from the host processor 210 via the first communication port 242.

Next, the controller 240 may store the data of an area, which is in the dirty state, within the volatile memory device 230 in the non-volatile storage device 250 (S920). For example, in response to the checkpoint request, the memory translation controller 420 stores the data in the dirty state within the volatile memory device 230 in the non-volatile storage device 250 via the storage controller 440 and the memory controller 450. With this feature, the performance of the computing systems 100 and 200 can be improved while maintaining consistency of data.

Next, the controller 240 may release the dirty flag of the area, which is in the dirty state, within the volatile memory device 230 (S930). For example, when the storage of the data in the dirty state is completed, the memory translation controller 420 may release the dirty flag of the area, which is in the dirty state, within the volatile memory device 230.

The methods in accordance with the present disclosure may be computer-implemented methods. Although each step of the corresponding methods has been shown and described in a given order in the present disclosure, the respective steps may also be performed in an order that can be combined arbitrarily according to the present disclosure, in addition to being performed in sequence. In one embodiment, at least some of the steps may be performed in parallel, iteratively, or heuristically. The present disclosure does not exclude making changes or modifications to the methods. In one embodiment, at least some of the steps may be omitted or other steps may be added.

Various embodiments of the present disclosure may be implemented as software recorded on a machine-readable recording medium. The software may be software for implementing the various embodiments of the present disclosure described above. Software may be inferred from the various embodiments of the present disclosure by programmers skilled in the art to which the present disclosure pertains. For example, the software may be machine-readable commands (e.g., code or code segments) or programs. A machine is a device capable of operating according to instructions called from a recording medium, and may be, for example, a computer. In one embodiment, the machine may be the host processor 110 or 210 or the computing system 100 or 200 including the same in accordance with the embodiments of the present disclosure. In one embodiment, the processor of the machine may execute the called command and cause the components of the machine to perform functions corresponding to the command. The recording medium may refer to any type of recording medium on which data readable by a machine are stored. The recording medium may include, for example, ROM, RAM, CD-ROM, magnetic tapes, floppy disks, optical data storage devices, and the like. In one embodiment, the recording medium may be implemented in a distributed form over networked computer systems or the like. The software may be stored in a distributed manner and executed on a computer system or the like. The recording medium may be a non-transitory recording medium. A non-transitory recording medium refers to a tangible medium regardless of whether data is stored in it semi-permanently or temporarily, and does not include signals propagating in a transitory manner.

Although the technical idea of the present disclosure has been described by various embodiments above, the technical idea of the present disclosure includes various substitutions, modifications, and changes that can be made within the scope that can be understood by those skilled in the art to which the present disclosure pertains. Further, it is to be understood that such substitutions, modifications, and changes may fall within the scope of the appended claims. The embodiments in accordance with the present disclosure may be combined with each other. The respective embodiments may be combined in various ways according to the number of cases, and the combined embodiments also fall within the scope of the present disclosure.

What is claimed is:

1. A byte-addressable device comprising:
   a volatile memory device; and
   a controller configured to be connected with a host processor, the volatile memory device, and a non-volatile memory,
   wherein the controller is further configured to communicate with the volatile memory device and the non-volatile memory based on address information included in a request received from the host processor, and
   wherein the controller:
   comprises a compute express link (CXL) end point for communicating with the host processor by using a CXL protocol, and a communication port for communicating with the non-volatile memory by using a block-addressable protocol, and
   is further configured to:
   determine whether data corresponding to an address in bytes included in the request received via the CXL end point is stored in the volatile memory device based on a mapping table, and
   perform at least one of byte addressing to the volatile memory device or block addressing to the non-volatile memory via the communication port based on the determination result.

2. The byte-addressable device of claim 1, wherein the controller communicates with the volatile memory device by using a predetermined protocol, and
   the predetermined protocol is a byte-addressable protocol that allows data to be read and written by assigning addresses in bytes.

3. The byte-addressable device of claim 1, wherein the controller communicates with the volatile memory device by using a predetermined interface, and
   the predetermined interface is a parallel interface.

4. The byte-addressable device of claim 1, wherein the controller is further configured to transmit the data corresponding to the address in bytes to the host processor.

5. The byte-addressable device of claim 4, wherein the controller is further configured to:
   in response to determining that the data corresponding to the address in bytes is stored in the volatile memory device, translate the address in bytes into a volatile memory address in bytes by using the mapping table, and
   perform a data read or write by assigning addresses in bytes to the volatile memory device based on the address in bytes.

6. The byte-addressable device of claim 4, wherein the controller is further configured to:
   in response to determining that the data corresponding to the address in bytes is not stored in the volatile memory device, generate a block address including the address in bytes, and
   perform a data read or write by assigning addresses in blocks to the non-volatile memory based on the generated block address.

7. The byte-addressable device of claim 1, wherein the controller is further configured to:
   in response to determining that the data corresponding to the address in bytes is not stored in the volatile memory device, generate a block address including the address in bytes,
   secure a space as large as a size of the block address in the volatile memory device,
   perform a data read in blocks from the non-volatile memory based on the block address,
   store data corresponding to the block address in the secured space of the volatile memory device,
   record the block address and a volatile memory address in which the data corresponding to the block address is stored in the mapping table,
   translate the address in bytes included in the request into a volatile memory address in bytes by using the mapping table, and perform a data read or data write to the volatile memory device according to the request based on the volatile memory address in bytes.

8. The byte-addressable device of claim 7, wherein before securing the space as large as the size of the block address in the volatile memory device, the controller is further configured to:
    select a victim area in the volatile memory device based on the size of the block address,
    in response to determining that the victim area of the volatile memory device is in a dirty state, store data of the victim area of the volatile memory device in the non-volatile memory, and
    delete an entry associated with the victim area in the mapping table.

9. The byte-addressable device of claim 8, wherein the victim area is determined to minimize performance degradation and write amplification.

10. The byte-addressable device of claim 1, wherein the controller is further configured to:
    receive a checkpoint request from the host processor,
    store data of an area, which is in a dirty state, within the volatile memory device in the non-volatile memory, and
    release a dirty flag of the area, which is in the dirty state, within the volatile memory device.

11. The byte-addressable device of claim 1, wherein the controller comprises:
    an address remapper configured to determine whether the data corresponding to the address in bytes is stored in the volatile memory device based on the mapping table, and translate the address in bytes to a volatile memory address in bytes by using the mapping table; and
    a memory translation controller configured to manage the mapping table that translates reciprocally between byte addressing to the volatile memory device or block addressing to the non-volatile memory.

12. The byte-addressable device of claim 11, wherein the request is a write request, and
    the address remapper is further configured to record a dirty flag, which indicates that data has been updated, in meta information corresponding to the address in bytes in response to receiving the write request from the host processor.

13. The byte-addressable device of claim 11, wherein the controller further comprises:
    a memory manager configured to secure an empty space in the volatile memory device; and
    a storage controller configured to drive the non-volatile memory according to a determination of the memory translation controller, assign addresses in blocks, and perform a data read or write.

14. The byte-addressable device of claim 13, wherein the storage controller is further configured to perform a wear leveling algorithm to prevent an uneven wear phenomenon due to biased writes.

15. The byte-addressable device of claim 11, wherein the controller further comprises:
    a cache memory configured to store data that has ever been accessed or expected to be accessed; and
    a memory controller configured to be connected with the volatile memory device and the cache memory.

16. The byte-addressable device of claim 11, wherein the controller further comprises:
    a computation accelerator configured to accelerate at least one computation of particular functions of the host processor or particular functions of the controller to minimize data movement between the host processor and the controller.

17. The byte-addressable device of claim 1, further comprising the non-volatile memory,
    wherein the non-volatile memory comprises:
    a plurality of non-volatile storages; and
    a switch configured to be connected with the controller and the plurality of non-volatile storages.

18. A computing system comprising:
    a host processor;
    a byte-addressable device; and
    a non-volatile memory,
    wherein the byte-addressable device comprises:
    a volatile memory device; and
    a controller configured to be connected with the host processor, the volatile memory device, and the non-volatile memory,
    wherein the controller is further configured to communicate with the volatile memory device and the non-volatile memory based on address information included in a request received from the host processor, and
    wherein the controller:
    comprises a compute express link (CXL) end point for communicating with the host processor by using a CXL protocol, and a communication port for communicating with the non-volatile memory by using a block-addressable protocol, and
    is further configured to:
        determine whether data corresponding to an address in bytes included in the request received via the CXL end point is stored in the volatile memory device based on a mapping table, and
        perform at least one of byte addressing to the volatile memory device or block addressing to the non-volatile memory via the communication port based on the determination result.

* * * * *